US 6,643,389 B1

(12) United States Patent
Raynal et al.

(10) Patent No.: US 6,643,389 B1
(45) Date of Patent: Nov. 4, 2003

(54) NARROW ARRAY CAPACITIVE FINGERPRINT IMAGER

(75) Inventors: Frederic Raynal, Berkeley, CA (US); Vito Fabrizzio, El Cerrito, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/537,699

(22) Filed: Mar. 28, 2000

(51) Int. Cl.[7] .............................. G06K 9/00; G06K 9/74
(52) U.S. Cl. ...................... 382/124; 382/115; 382/126; 356/71
(58) Field of Search ................................. 361/179, 181; 356/71; 324/602, 671, 686; 382/115, 116, 124, 125, 126

(56) References Cited

U.S. PATENT DOCUMENTS

| | | | | | |
|---|---|---|---|---|---|
| 5,355,501 | A | * | 10/1994 | Gross et al. | 713/323 |
| 6,282,303 | B1 | * | 8/2001 | Brownlee | 382/124 |
| 6,289,114 | B1 | * | 9/2001 | Mainguet | 382/124 |
| 6,317,508 | B1 | * | 11/2001 | Kramer et al. | 382/124 |
| 6,320,394 | B1 | * | 11/2001 | Tartagni | 324/671 |
| 6,333,989 | B1 | * | 12/2001 | Borza | 382/124 |
| 6,362,633 | B1 | * | 3/2002 | Tartagni | 324/662 |
| 6,408,087 | B1 | * | 6/2002 | Kramer | 382/124 |
| 2001/0043728 | A1 | * | 11/2001 | Kramer et al. | 382/124 |

* cited by examiner

*Primary Examiner*—Rodney Fuller
(74) *Attorney, Agent, or Firm*—Lisa K. Jorgenson; William A. Munck

(57) ABSTRACT

A narrow array capacitive semiconductor fingerprint detection system includes an array of capacitive sensing elements. The array has a first dimension about the width of a fingerprint and second dimension less than the length of a fingerprint. A scan control unit is coupled to scan the array at a scan rate determined by the speed of finger movement over the array. The scan control unit scans the array capture partial fingerprint images. Output logic is coupled to the array to assemble the captured fingerprint images into a complete image based upon the direction of finger movement over the array. A mouse device is positioned adjacent the array in the path of finger movement over the array. The mouse device is coupled to provide finger movement speed information to the scan control unit. The mouse device is also coupled to provide finger movement direction information to the output logic.

20 Claims, 1 Drawing Sheet

NARROW ARRAY CAPACITIVE FINGERPRINT IMAGER

FIELD OF THE INVENTION

The present invention relates generally to the field of methods of and system for capturing fingerprint images, and more particularly to a narrow array capacitive semiconductor fingerprint imaging system.

DESCRIPTION OF THE PRIOR ART

Fingerprint recognition has been suggested for use in many security applications, such as controlling access to buildings, computers, or the like. Fingerprint recognition systems enable a user to access the controlled facility without having to provide a device such as a keypad or card reader, and without having the user memorize a password, or other personal identification number, or carry a card key.

The sensing device is an important part of a fingerprint recognition system. The quality of the fingerprint image that the sensing device produces will affect recognition capability and the amount of processing required for verification of the fingerprint.

Various technologies have been proposed for use in fingerprint sensing devices. One commonly proposed technology involves optical image detection. Examples of optical fingerprint detection devices are disclosed in Jensen, U.S. Pat. No. 4,784,484; Fishbine, et al., U.S. Pat. No. 5,467,403; and Giles, et al., U.S. Pat. No. 5,548,394.

Optical detectors include a glass surface upon which a subject places his finger to be recognized. Optical detectors may present recognition problems when the glass surface or the subject's finger is wet. The optics of the detectors are constructed based upon the indices of refraction of air and glass. When water or perspiration is between the glass and surface of the finger, the operation of the detector is affected. Additionally, optical detectors may be "spoofed" by placing an image of a valid fingerprint on the glass surface.

In addition to optical sensors, various electrical sensor systems have been proposed, as for example in Knapp, U.S. Pat. No. 5,325,442; Tamori, U.S. Pat. No. 5,400,662; and Tamori, U.S. Pat. No. 5,429,006. The electrical detection devices typically comprise an array of sense elements. The individual sense elements respond with an output that depends on whether a fingerprint valley or ridge is located over the sense element.

The electrical detection devices offer some advantages over the optical detection devices. The optics of the optical devices can be larger and expensive. The electrical detection devices are less subject to the moisture problems discussed with respect to the optical devices. Also, electrical detectors sense based upon a three-dimensional fingerprint model, making them less subject to spoofing with a two-dimensional fingerprint image. However, electrical detectors are subject to scratching and electrostatic discharge, thereby having some disadvantages in terms of robustness. Also, most electrical fingerprint detectors are based upon large arrays of sensing elements and therefore can be expensive.

An example of a larger array electrical sensing device is the TouchChip (TM) Silicon Fingerprint Sensor, which is available from STMicroelectronics, Inc. The TouchChip sensor uses an active pixel array based upon a capacitive feedback sensing circuit of the type disclosed in Tartagni, U.S. patent application Ser. No. 08/799,548, filed Feb. 13, 1997, titled Capacitive Distance Sensor. The array of the TouchChip sensor comprises 364 rows and 256 columns of cells, representing 93,184 pixels, and having dimensions of about 18.2 mm by about 12.8 mm. Each pixel cell contains a high-gain inverter connected to two adjacent top metal plates separated from the skin surface by an ultra-hard protective coating. The inverter input is connected to one of the top metal plates and the inverter output is connected to the other top metal plate. The cell provides a charge integrator whose feedback capacitance is the effective capacitance between the two top metal plates.

When a finger is placed on the sensor, the surface of the skin over a pixel cell acts as a third plate separated from the two adjacent plates by a dielectric layer composed of air. Because fingerprint valleys will be farther from the sensor surface than fingerprint ridges, pixel cells beneath valleys will have more distance between their top metal plates and the skin surface than pixel cells under ridges. The thickness of the dielectric layer modulates the capacitive coupling between the top metal plates of the pixel cell so that top metal plates under valleys will exhibit different effective capacitance than top plates under ridges.

In Kramer, et al., U.S. Pat. No. 6,317,508 titled Scanning Capacitive Semiconductor Fingerprint Detector, there is disclosed a narrow array capacitive fingerprint detector. The Kramer, et al. detector comprises an array of capacitive pixel cells of the type disclosed in Tartagni. The array of Kramer, et al. is about 256 by about 20 to 50. Accordingly, the array has a first dimension that is about the width of a fingerprint and a length that is substantially less than the length of a fingerprint. The Kramer et al. device captures a fingerprint image as the subject sweeps the fingertip over the narrow array as the array is scanned on each scan, the narrow array captures a partial image or slice of the fingerprint. A regeneration algorithm assembles the slices into the complete fingerprint image.

One of the problems with a narrow array device is that the speed at which the finger is swept over the array is unknown. In order to reconstruct the fingerprint image, a pair of consecutive slices must have enough rows in common for them to be aligned by the regeneration algorithm. The more rows in common from one slice to the next, the more exactly the regeneration algorithm can combine two slices into a single larger slice. Thus, the fingerprint image must be over-sampled. Since different people sweep their fingers at different speeds and the speed at which a person moves the finger during any particular sweep is not generally not uniform, the fingerprint image must be substantially over-sampled.

The narrow array must be scanned at a relatively high clock rate to ensure that the fingerprint image is sufficiently over-sampled. Additionally, the number of rows in the narrow array must be sufficient, for a given clock rate, to ensure that the fingerprint image is sufficiently over-sampled. The over-sampling required for accurate image reconstruction requires substantial memory. Finally, the regeneration algorithm required for reconstructing the image requires processor resources.

Thus, although a narrow array device is less expensive to build than a large array device, narrow array devices may be more expensive in terms of memory and processing resources.

SUMMARY OF THE INVENTION

The present invention provides a narrow array capacitive semiconductor fingerprint detection system that captures a plurality of partial fingerprint images and assembles the partial images into a complete fingerprint image substantially without over-sampling. The system of the present invention includes an array of capacitive sensing elements. The array has a first dimension about the width of a fingerprint and second dimension less than the length of a fingerprint. A scan control unit is coupled to scan the array at a scan rate determined by the speed of finger movement over the array. The scan control unit scans the array capture, partial fingerprint images. Output logic is coupled to the array to assemble the captured fingerprint images into a complete image based upon the direction of finger movement over the array. A mouse device is positioned adjacent the array in the path of finger movement over the array. The mouse device is coupled to provide finger movement speed information to the scan control unit. The mouse device is also coupled to provide finger movement direction information to the output logic.

DESCRIPTION OF THE PREFERRED EMBODIMENT

Figure 1:
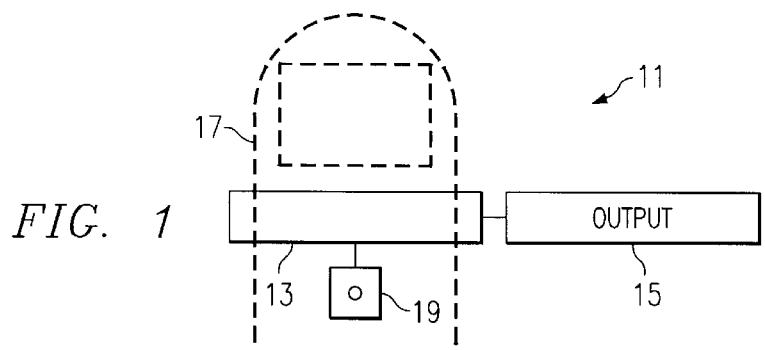
FIG. 1 a plan view of a fingerprint detection system according to the present invention.

Referring now to the drawings, and first to FIG. 1, a fingerprint detector according to the present invention is designated generally by the numeral 11. Fingerprint detector 11 includes a scanning sensor array 13, which captures partial images of a fingerprint, and a suitable output indicated generally at 15. Scanning array 13 is preferably fabricated on a single semiconductor chip.

As will be explained in detail hereinafter, sensor array 13 comprises a rectangular array of a plurality of capacitive pixel cells arranged in rows and columns. In the preferred embodiment, the capacitive pixel cells are on a pitch of about 50 microns, which corresponds to a resolution of about 508 dpi. In the preferred embodiment, array 13 is about one-half inch or 12.8 mm wide. The length of array 13 substantially less than the length of the end of a finger 17. In the preferred embodiment, the length of array 13 is about one or two mm.

As will be explained in detail hereinafter, fingerprint detector 11 captures a fingerprint image as finger 17 is swept over array 13. Fingerprint detector 11 includes a mouse device 19. Mouse device 19 is preferably of a small size and it is positioned adjacent array 13 in the path of movement of finger 17 over array 13. The resolution of mouse device 19 is selected to be substantially the same as the resolution of array 13. Thus, in the preferred embodiment, the resolution of mouse device 19 is about 500 dpi. Mouse device 19 is positioned to contact finger 17 as finger 17 is swept over array 13. As will be explained in detail hereinafter, mouse device 17 is adapted to provide finger movement speed and direction information to fingerprint detector 11.

Figure 2:
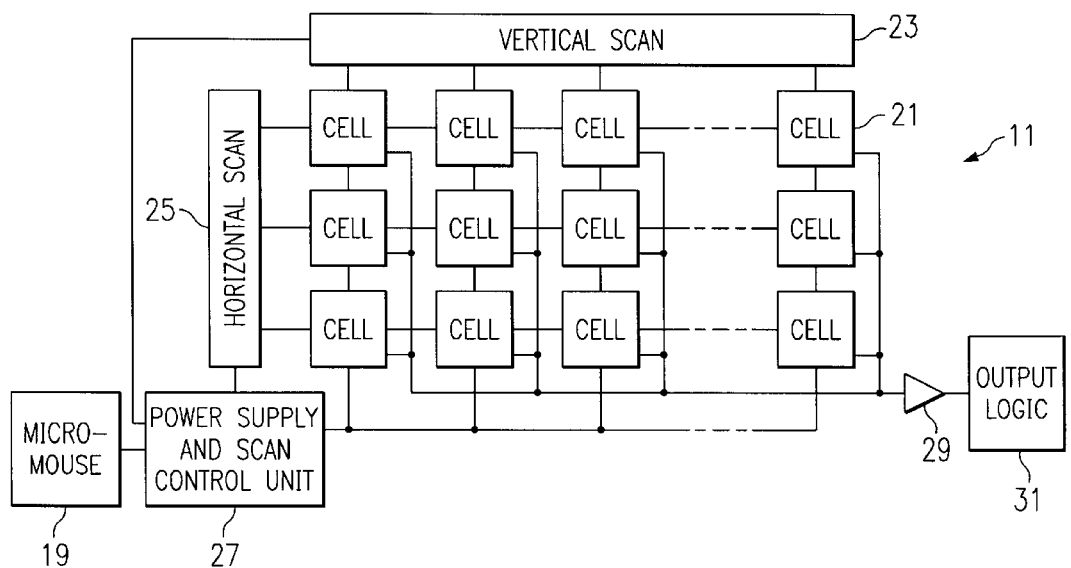
FIG. 2 is block diagram of a fingerprint detection system according to the present invention.

Referring now to FIG. 2, there is shown a block diagram of fingerprint detector 11. Fingerprint detector 11 is preferably integrated into a single chip, and it includes a rectangular array 13 of cells, preferably of the type illustrated in FIG. 3 hereof. Each cell is smaller than the width of a fingerprint ridge or valley and preferably about 50 microns on a side.

Detector 11 includes a vertical scanning stage 23 and horizontal scanning stage 25. Scanning stages 23 and 25 enable one cell 21 at a time according to a predetermined scanning pattern. The scanning rate is determined according to the speed of finger movement over array 13 as determined by mouse device 19.

A power supply and scan control unit 27 is coupled to mouse device 19 as well as scanning stages 23 and 25. The power supply portion of unit 27 supplies a reference voltage to each cell 21 as well as power to the other components of detector 11. The scan control portion of unit 27 uses finger movement speed information received from mouse device 19 to operate scanning stages 23 and 25 to scan array 13 substantially without over-sampling.

Unit 27 also uses mouse movement information to place detector 11 alternatingly in active and standby or idle states. When detector 11 is in the active state, unit 27 starts a timer. If no mouse movement is detected before the timer times out, unit 27 places detector 11 in an idle state. If mouse movement is detected while detector is in the idle state, unit 27 places detector 11 in the active state.

An A/D converter 29 is connected to receive the output of each cell 21 of array 13. The output of A/D converter 29 is connected to output logic 31. Output logic 31 is coupled to mouse receive finger movement direction information from mouse device 19. Output logic 31 uses the direction movement information received from mouse device 19 align properly successive images captured by array 11.

In the preferred embodiment, detector 11 is super integrated in that all functions required for fingerprint image capture and authentication are integrated into a single chip. Thus, in addition to the elements discussed with reference to FIG. 2, detector 11 includes memory to store the template as well as algorithms for image reconstruction, minutia extraction, matching, recognition core, and anti-spoofing. A micro-controller is integrated into detector 11 to manage all of the operations performed by the chip. Detector also preferably includes encryption.

Figure 3:
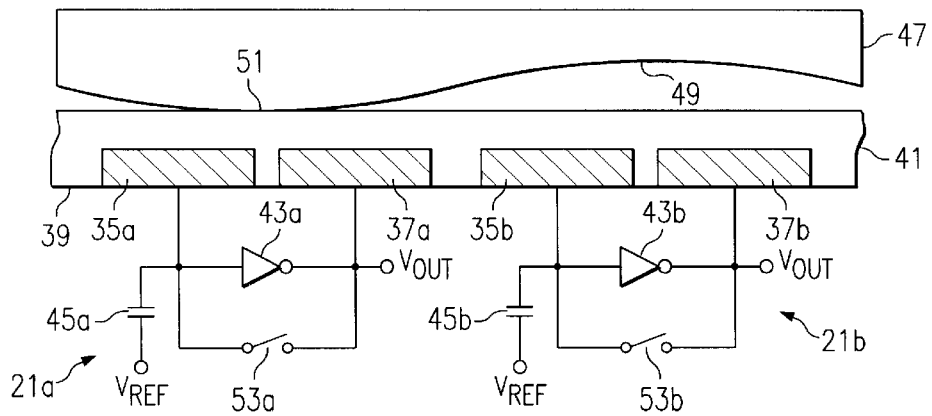
FIG. 3 illustrates the physical structure and electrical operation of individual capacitive pixel cells according to the present invention.

Referring now to FIG. 3, there is illustrated the structure and operation of a capacitive pixel cell 21 according to the present invention. The cell of the preferred embodiment of the present invention is of the type disclosed in Tartagni, U.S. patent application Ser. No. 08/799,548, filed Feb. 13, 1997, titled Capacitive Distance Sensor, the disclosure of which is incorporated herein by reference. Each cell 21 includes a first conductor plate 35 and a second conductor plate 37 supported on a semiconductor substrate, which is preferably a conventional silicon substrate that may have a conventional shallow epitaxial layer defining an upper surface region thereof. The top surface of the substrate includes an insulating layer 39. Insulating layer 39 is preferably an oxide layer, which may be a conventional thermally-grown silicon dioxide layer. Conductor plates 35 and 37 are covered by a protective coating 41 of a hard material, which protects cell 21 from moisture, contamination, abrasion, and electrostatic discharge.

Each cell 21 includes a high gain inverting amplifier 43. The input of inverting amplifier 43 is connected to a reference voltage source $V_{REF}$ through an input capacitor 45. The output of inverting amplifier 43 is connected to an output $V_{OUT}$. The input of inverting amplifier 43 also connected to first conductor plate 35 and the output of inverting amplifier 43 is connected to second conductor plate 37, thereby creating a charge integrator whose feedback capacitance is the effective capacitance between conductor plates 35 and 37.

When a finger 47 is placed on the surface of protective coating 41, the surface of the skin over each cell 21 acts as a third capacitor plate separated from adjacent conductor plates 35 and 37 by a dielectric layer that includes protective coating 41 and a variable thickness of air. Because fingerprint valleys 49 will be farther from conductor plates 35 and 37 than fingerprint ridges 51, cells 21 beneath valleys 49 will exhibit a different effective capacitance between their conductor plates 35 and 37 and the skin surface than cells 21 under ridges 51. The thickness of this dielectric layer will modulate the capacitance coupling between plates 35 and 37 of each cell 21. Accordingly, cells 21 under valleys 49 will exhibit a different effective capacitance than cells 21 under ridges 51.

Cells 21 works in three phases. During the first phase, the charge integrator is reset with a switch 53 by shorting the input and output of inverting amplifier 43. Preferably, switch 53 is a reset transistor having a source connected to the input of inverting amplifier 43 and a drain connected to the output. The input and output are shorted by applying a reset voltage on the gate of a reset transistor. The second phase disconnects the output and input by opening switch 53 by applying the ground on the gate of the reset transistor. The application of the ground to the gate of the reset transistor causes a phenomenon called injection in which charges are injected into both the input and output plates. During the third phase, a fixed charge is applied to the charge integrator input, which causes an input voltage swing inversely proportional to the feedback capacitance, which is the effective capacitance between conductor plates 35 and 37. For a fixed amount of input charge, the output of inverting amplifier 43 will range between two extremes depending on charge injection and the effective feedback capacitance value. The first extreme is a saturated voltage level if the effective feedback capacitance is very small. The second extreme is a voltage close to the logical threshold, which is less than the reset value, when the effective feedback capacitance is large.

In operation, a subject slides his or her finger over array 13 and mouse device 19. Detector 11 scans array 11 at a rate determined according to the speed of finger movement measured by mouse device 19. Since the scan rate is determined with reference to the speed of finger movement, partial fingerprint images or slices are captured substantially without over-sampling or overlap between successive slices. The detector assembles a complete fingerprint image using finger movement direction information measured by mouse device 19.

The present invention has been described and illustrated with reference to a presently preferred embodiment. Those skilled in the art, given the benefit of the foregoing disclosure will recognize alternative embodiments. Accordingly, the foregoing disclosure is intended for purposes of illustration and not of limitation.

What is claimed is:

1. A scanning fingerprint detection system, which comprises:
    an array of capacitive sensing elements, said array having a first dimension about the width of a fingerprint and second dimension less than the length of a fingerprint;
    means, including a member proximate said array and physically rotated by movement of a finger concurrently over both said array and said member, for measuring the speed and direction of finger movement over said array;
    means for scanning said array at a rate determined by said speed of said movement of said finger to capture an image of a portion of a fingerprint; and,
    means for assembling captured images into a fingerprint image based upon said direction of finger movement.

2. The fingerprint detection system as claimed in claim 1, wherein said means for measuring the speed and direction of finger movement over said array includes a mouse device positioned adjacent said array.

3. The fingerprint detection system as claimed in claim 2, wherein said mouse device is positioned in the path of finger movement over said array.

4. The fingerprint detection system as claimed in claim 2, wherein said means for scanning said array at a rate determined by said speed of finger movement includes a scan control unit coupled to said mouse device.

5. The fingerprint detection system as claimed in claim 2, wherein said means for assembling said captured images into a fingerprint image based upon said direction of finger movement includes output logic coupled to said mouse device.

6. A scanning fingerprint detection system, which comprises:
    an array of capacitive sensing elements, said array having a, first dimension about the width of a fingerprint and second dimension less than the length of a fingerprint;
    means, including a member proximate said array and physically rotated by movement of a finger concurrently over both said array and said member, for measuring the speed of finger movement over said array; and
    means for scanning said array at a rate determined by said speed of said movement of said finger to capture an image of a portion of a fingerprint.

7. The fingerprint detection system as claimed in claim 6, wherein said means for measuring the speed of finger movement over said array includes a mouse device positioned adjacent said array.

8. The fingerprint detection system as claimed in claim 7, wherein said mouse device is positioned in the path of finger movement over said array.

9. The fingerprint detection system as claimed in claim 7, wherein said means for scanning said array at a rate determined by said speed of finger movement includes a scan control unit coupled to said mouse device.

10. The fingerprint detection system as claimed in claim 6, including means for assembling captured images into a fingerprint image.

11. The fingerprint detection system as claimed in claim 6, including:
    means for determining the direction of finger movement over said array; and,
    means for assembling captured images into a fingerprint image based upon the direction of finger movement.

12. The fingerprint detection system as claimed in claim 11, wherein said means for determining the direction of finger movement over said array includes:
    a mouse device positioned adjacent said array.

13. The fingerprint detection system as claimed in claim 12, wherein said mouse device is positioned in the path of finger movement over said array.

14. The fingerprint detection system as claimed in claim 12, wherein said means for assembling captured images into a fingerprint image includes:
    output logic coupled to said mouse device.

15. A fingerprint detection system, which comprises:
    an array of capacitive sensing elements, said array having a first dimension about the width of a fingerprint and second dimension less than the length of a fingerprint;

a scan control unit coupled to said array;

output logic coupled to said array; and, a mouse device positioned adjacent said array in the path of finger movement over said array and including a member physically rotated by movement of a finger concurrently over both said array and said member, said mouse device being coupled to said scan control unit and said output logic.

16. The fingerprint detection system as claimed in claim 15, wherein said mouse device is adapted to measure the speed and direction of finger movement over said array.

17. The fingerprint detection system as claimed in claim 15, wherein said scan control unit is adapted to scan said array at a rate determined by the speed of finger movement measured by said mouse device.

18. The fingerprint detection system as claimed in claim 15, wherein said output logic is adapted to assemble images captured by said array based upon the direction of finger movement measured by said mouse device.

19. The fingerprint detection system as claimed in claim 15, including:

means for putting said system in an idle state in response to a predetermined delay without detecting movement of said mouse device.

20. The fingerprint detection system as claimed in claim 19, including:

means for putting said fingerprint detector in an active state in response to detecting movement of said mouse device while said fingerprint detector is in said idle state.

* * * * *